US012579719B2

(12) United States Patent
Yamakawa et al.

(10) Patent No.: US 12,579,719 B2
(45) Date of Patent: Mar. 17, 2026

(54) MEDICAL IMAGE PROCESSING APPARATUS AND MEDICAL IMAGE PROCESSING METHOD

(71) Applicant: FUJIFILM Healthcare Corporation, Kashiwa (JP)

(72) Inventors: Keisuke Yamakawa, Kashiwa (JP); Taiga Goto, Kashiwa (JP)

(73) Assignee: FUJIFILM Corporation, Tokyo (JP)

( * ) Notice: Subject to any disclaimer, the term of this patent is extended or adjusted under 35 U.S.C. 154(b) by 367 days.

(21) Appl. No.: 18/224,912

(22) Filed: Jul. 21, 2023

(65) Prior Publication Data

US 2024/0078723 A1     Mar. 7, 2024

(30) Foreign Application Priority Data

Sep. 7, 2022     (JP) ................................. 2022-142046

(51) Int. Cl.
      *G06T 12/30*         (2026.01)
      *G06T 5/50*          (2006.01)
      *G06T 5/70*          (2024.01)

(52) U.S. Cl.
      CPC ............... *G06T 12/30* (2026.01); *G06T 5/50* (2013.01); *G06T 5/70* (2024.01);
      (Continued)

(58) Field of Classification Search
      CPC . G06T 11/008; G06T 5/50; G06T 5/70; G06T 2207/10081; G06T 2207/20081; G06T 2207/20084; G06T 2207/20224; G06T 2207/30004; G06T 2210/41; G06T 2211/441; G06T 2211/448; G06T 7/0012; G06T 5/73; G06T 11/005; G06T 11/006; G06T 2211/436; G06T 11/00; G06T 11/003; G06T 2207/10064; G06T 2207/10072; G06T 2207/10076;
(Continued)

(56) References Cited

U.S. PATENT DOCUMENTS 8,891,885 B2      11/2014   Kachelriess et al.
2013/0156282 A1*   6/2013   Noda ........................ G06T 5/20
                                                                 382/131
(Continued)

FOREIGN PATENT DOCUMENTS

CN          114926560 A   *   8/2022   ........... G06T 11/008
CN          114943781 A   *   8/2022   ........... G01N 23/046
(Continued)

*Primary Examiner* — Jose L Couso
(74) *Attorney, Agent, or Firm* — Paul Teng

(57)     ABSTRACT

A medical image processing apparatus and a medical image processing method that can reduce the noise bias of a corrected image in which high absorber artifacts included in a reconstructed image are corrected. The medical image processing apparatus has an arithmetic unit for correcting high absorber artifacts. The arithmetic unit comprises: a projection data generating section that generates projection data corresponding to a high absorber area in a reconstructed image with high absorber artifacts; a noise image generating section that generates a noise image using the projection data; and a weighted combining section that makes a weighted combining of the noise image with a corrected image in which high absorber artifacts are corrected.

11 Claims, 7 Drawing Sheets

(52) U.S. Cl.
CPC ............... *G06T 2207/10081* (2013.01); *G06T 2207/20081* (2013.01); *G06T 2207/20084* (2013.01); *G06T 2207/20224* (2013.01); *G06T 2207/30004* (2013.01); *G06T 2210/41* (2013.01); *G06T 2211/441* (2023.08); *G06T 2211/448* (2023.08)

(58) Field of Classification Search
CPC . G06T 2207/10084; G06T 2207/10101; G06T 2207/10104; G06T 2207/10108; G06T 2207/10112; G06T 2207/10116; G06T 2207/10121; G06T 2207/10124; G06T 2207/30068; G06T 2211/40; G06T 2211/412; G06T 2211/452; G06T 2211/456; G06T 2211/464; G06T 3/4046; G06T 5/60; G06T 9/002; G06T 2207/20076; A61B 6/032; A61B 6/5258; A61B 6/00; A61B 6/03; A61B 6/025; A61B 6/12; A61B 6/467; A61B 6/5205; A61B 6/5211; A61B 6/54; A61B 5/7207; G01N 23/041; G01N 23/044; G01N 23/046; G01N 2223/401; G06N 3/02; G06N 3/08–088; G06N 3/0445; G06N 3/0454; G06N 3/0464; G06N 3/4046; G06N 3/4053; G06N 7/00; G06N 7/01; G06N 20/00; G06K 7/1482; G06V 10/454; G06V 10/54; G06V 10/7764; G06V 10/774; G06V 10/82; G06V 10/84; G06V 20/41; G06V 30/18057; G06V 20/698; G06V 30/19173; G06F 18/214; G06F 18/22; G06F 18/241; G06F 18/24; G06F 18/2411; G06F 18/2415; G06F 30/27; Y10S 128/925
See application file for complete search history.

(56)                References Cited

U.S. PATENT DOCUMENTS

| | | | | |
|---|---|---|---|---|
| 2016/0278733 A1* | 9/2016 | Ogura | .................. | G06T 7/0012 |
| 2020/0402644 A1* | 12/2020 | Zhou | .................... | G06V 30/244 |
| 2020/0410727 A1* | 12/2020 | Yamakawa | ........... | G06V 10/44 |
| 2021/0272336 A1* | 9/2021 | Yue | ........................... | G06T 7/11 |
| 2022/0139006 A1* | 5/2022 | Matsuura | .............. | A61B 6/032 382/131 |
| 2022/0287667 A1* | 9/2022 | Suzuki | ................. | A61B 6/5205 |

FOREIGN PATENT DOCUMENTS

| | | | | | |
|---|---|---|---|---|---|
| WO | WO-2010038536 A1 | * | 4/2010 | ............. | A61B 6/542 |
| WO | WO-2014033792 A1 | * | 3/2014 | .............. | A61B 6/12 |

* cited by examiner

MEDICAL IMAGE
PROCESSING APPARATUS
1

2 — ARITHMETIC UNIT

3 — MEMORY

4 — STORAGE UNIT

5 — NETWORK ADAPTER

6

7 DISPLAY UNIT

8 INPUT DEVICE

9

MEDICAL IMAGING EQUIPMENT — 10

MACHINE LEARNING PROCESSOR — 12

MEDICAL IMAGE DATABASE — 11

FIG.6

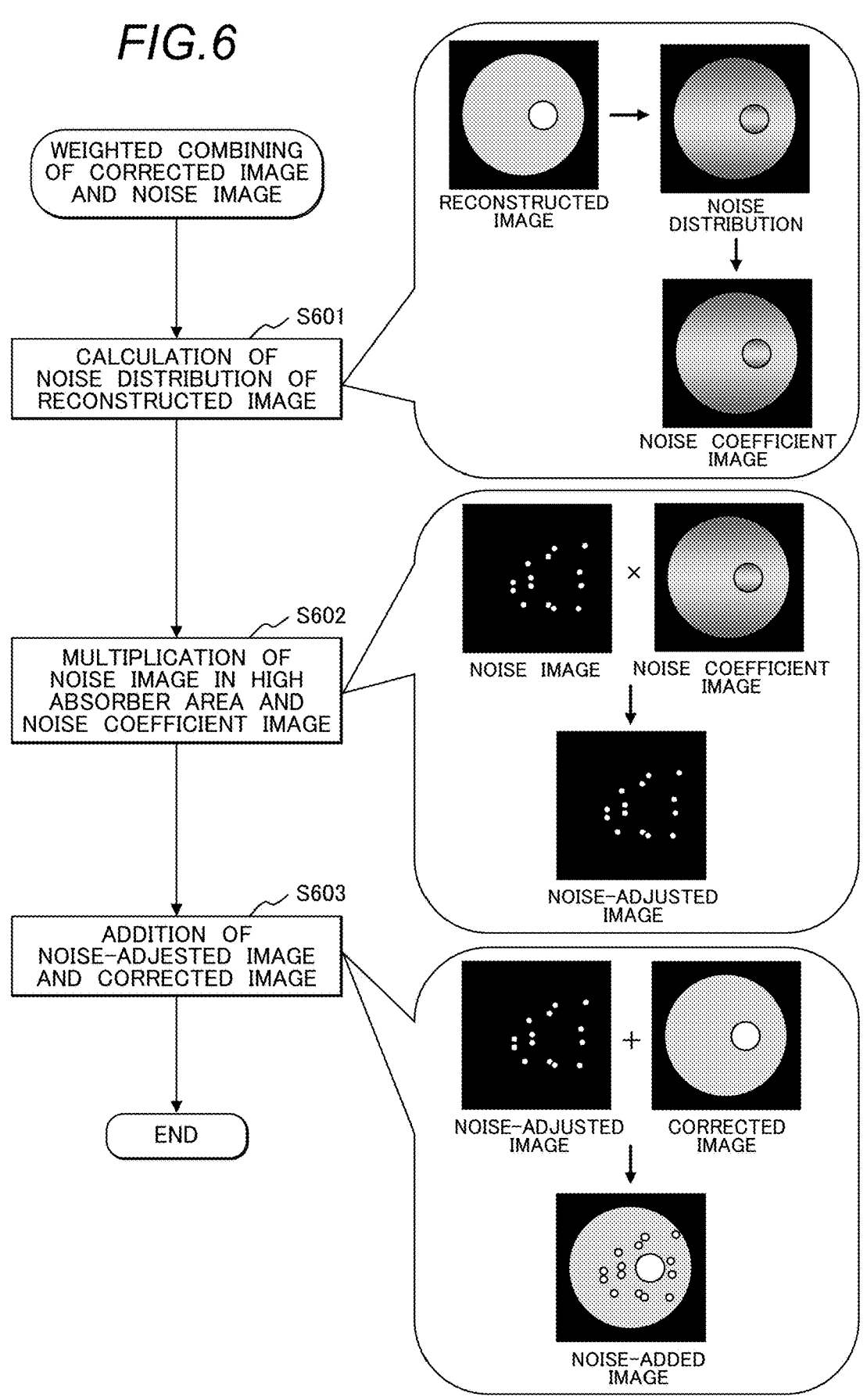

WEIGHTED COMBINING OF CORRECTED IMAGE AND NOISE IMAGE

RECONSTRUCTED IMAGE → NOISE DISTRIBUTION

NOISE COEFFICIENT IMAGE

S601 CALCULATION OF NOISE DISTRIBUTION OF RECONSTRUCTED IMAGE

NOISE IMAGE × NOISE COEFFICIENT IMAGE

NOISE-ADJUSTED IMAGE

S602 MULTIPLICATION OF NOISE IMAGE IN HIGH ABSORBER AREA AND NOISE COEFFICIENT IMAGE

S603 ADDITION OF NOISE-ADJESTED IMAGE AND CORRECTED IMAGE

NOISE-ADJUSTED IMAGE + CORRECTED IMAGE

NOISE-ADDED IMAGE

END

RECONSTRUCTED IMAGE
(WITH ARTIFACTS)

MACHINE
LEARNING
PROCESSOR

RECONSTRUCTED IMAGE
(WITHOUT ARTIFACTS)

RECONSTRUCTED IMAGE
(WITH ARTIFACTS)

NOISE-ADDED
IMAGE

MACHINE
LEARNING
PROCESSOR

RECONSTRUCTED IMAGE
(WITHOUT ARTIFACTS)

RECONSTRUCTED IMAGE
(WITH ARTIFACTS)

NOISE IMAGE

MACHINE
LEARNING
PROCESSOR

RECONSTRUCTED IMAGE
(WITHOUT ARTIFACTS)

MEDICAL IMAGE PROCESSING APPARATUS AND MEDICAL IMAGE PROCESSING METHOD

CLAIM OF PRIORITY

The present application claims priority from Japanese Patent Application JP 2022-142046 filed on Sep. 7, 2022, the content of which is hereby incorporated by reference into this application.

BACKGROUND OF THE INVENTION

The present invention relates to a medical image processing apparatus that deals with a medical image obtained by medical imaging equipment such as X-ray CT (Computed Tomography) equipment and a medical image processing method, and more particularly to a technique for correcting artifacts which occur when a test object includes a highly absorbent material (high absorber) such as metal.

X-ray CT equipment as an example of medical imaging equipment is equipment that generates a reconstructed image of the test object to be used for diagnostic imaging, by irradiating X rays from around the test object to acquire projection data at a plurality of projection angles and back-projecting the projection data. If the test object includes a highly absorbent material like metal, for example, a plate used for fixing a bone, a high absorber artifact due to the highly absorbent material occurs in a medical image, posing a problem of obstructing diagnostic imaging. The technology to reduce metal artifacts is called MAR (Metal Artifact Reduction) and includes various methods such as the beam hardening correction method, linear interpolation method and deep learning method.

U.S. Pat. No. 8,891,885 discloses that a corrected image is obtained by weighted summation of a high-pass-filtered image of an original image and a high-pass-filtered image of an MAR image in which metal artifacts are reduced, the weightings being dependent on the proximity to metal, and further by summation of the low-pass-filtered image of the MAR image.

SUMMARY OF THE INVENTION

However, U.S. Pat. No. 8,891,885 gives no consideration to noise bias of a corrected image in which high absorber artifacts are corrected. In other words, since noise is excessively reduced with correction of high absorber artifacts in the vicinity of a high absorber, noise bias occurs between the remoter area and nearer area from the high absorber, posing a problem in diagnostic imaging.

Therefore, the object of the present invention is to provide a medical image processing apparatus and a medical image processing method that can reduce the noise bias of a corrected image in which high absorber artifacts included in a reconstructed image are corrected.

In order to achieve the above object, according to one aspect of the present invention, there is provided a medical image processing apparatus comprising an arithmetic unit for correcting high absorber artifacts, in which the arithmetic unit comprises: a projection data generating section that generates projection data corresponding to a high absorber area in a reconstructed image with high-absorber artifacts; a noise image generating section that generates a noise image using the projection data; and a weighted combining section that makes a weighted combining of the noise image with a corrected image in which high absorber artifacts are corrected.

According to another aspect of the present invention, there is provided a medical image processing method for correcting high absorber artifacts, which comprises: a projection data generating step of generating projection data corresponding to a high absorber area in a reconstructed image with high absorber artifacts; a noise image generating step of generating a noise image using the projection data; and a weighted combining step of making a weighted combining of the noise image with a corrected image in which high absorber artifacts are corrected.

According to the present invention, it is possible to provide a medical image processing apparatus and a medical image processing method that can reduce the noise bias of a corrected image in which high absorber artifacts included in a reconstructed image are corrected.

BRIEF DESCRIPTION OF THE DRAWINGS

FIG. 6 is a flowchart that shows an example of the processing sequence at S303 according to the first embodiment.

DETAILED DESCRIPTION OF THE PREFERRED EMBODIMENTS

Hereinafter, a medical image processing apparatus and a medical image processing method according to the present invention will be described referring to the accompanying drawings. In the explanation below and the accompanying drawings, constituent elements with the same functions are designated by the same reference signs and repeated description thereof is omitted.

First Embodiment

Figure 1:
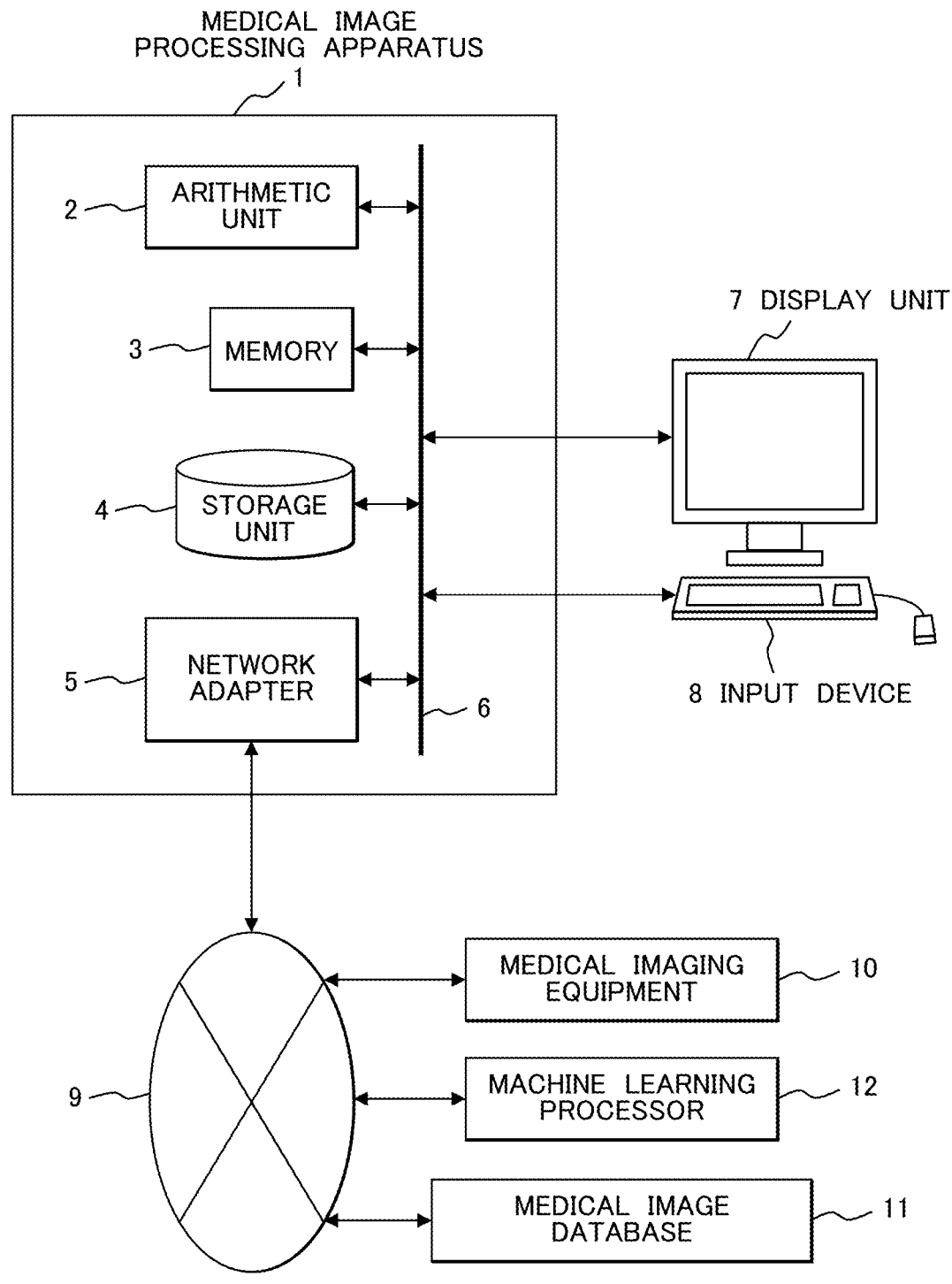
FIG. 1 is a general configuration diagram of a medical image processing apparatus.

FIG. 1 is a diagram that shows the hardware configuration of the medical image processing apparatus 1. The medical image processing apparatus 1 includes an arithmetic unit 2, a memory 3, a storage unit 4, and a network adapter 5 which are connected in a manner to enable a signal to be transmitted and received through a system bus 6. In addition, the medical image processing apparatus 1 is connected to medical imaging equipment 10, a medical image database 11, and a machine learning processor 12 in a manner to enable a signal to be transmitted and received through a network 9. Furthermore, a display unit 7 and an input device 8 are connected to the medical image processing apparatus 1. Here, "to enable a signal to be transmitted and received" means a condition in which a signal can be transmitted and received mutually or from one side to the other, whether electrically or optically and by wires or wirelessly.

The arithmetic unit 2 is a device that controls operation of various components. Specifically, it may be a CPU (Central Processing Unit), MPU (Micro Processor Unit) or the like. The arithmetic unit 2 loads the program stored in the storage unit 4 and the necessary data for execution of the program onto the memory 3 and executes the program to perform various types of image processing for a medical image. The memory 3 stores the progress of the program being executed by the arithmetic unit 2 or the arithmetic operation being performed by it. The storage unit 4 stores the program to be executed by the arithmetic unit 2 or the necessary data for execution of the program and specifically it may be an HDD (Hard Disk Drive), SSD (Solid State Drive) or the like. The network adapter 5 is used to connect the medical image processing apparatus 1 to the network 9 such as LAN, a phone line or the internet. The various data that the arithmetic unit 2 deals with may be transmitted or received with a device outside the medical image processing apparatus 1 through the network 9 such as LAN (local Area Network).

The display unit 7 shows the result of processing by the medical image processing apparatus 1 and specifically it is a liquid crystal display or the like. The input device 8 is an operation device with which the operator gives an operation instruction to the medical image processing apparatus 1 and specifically it is a keyboard and mouse, touch panel or the like. The mouse may be a pointing device such as a track pad or track ball.

Figure 2:
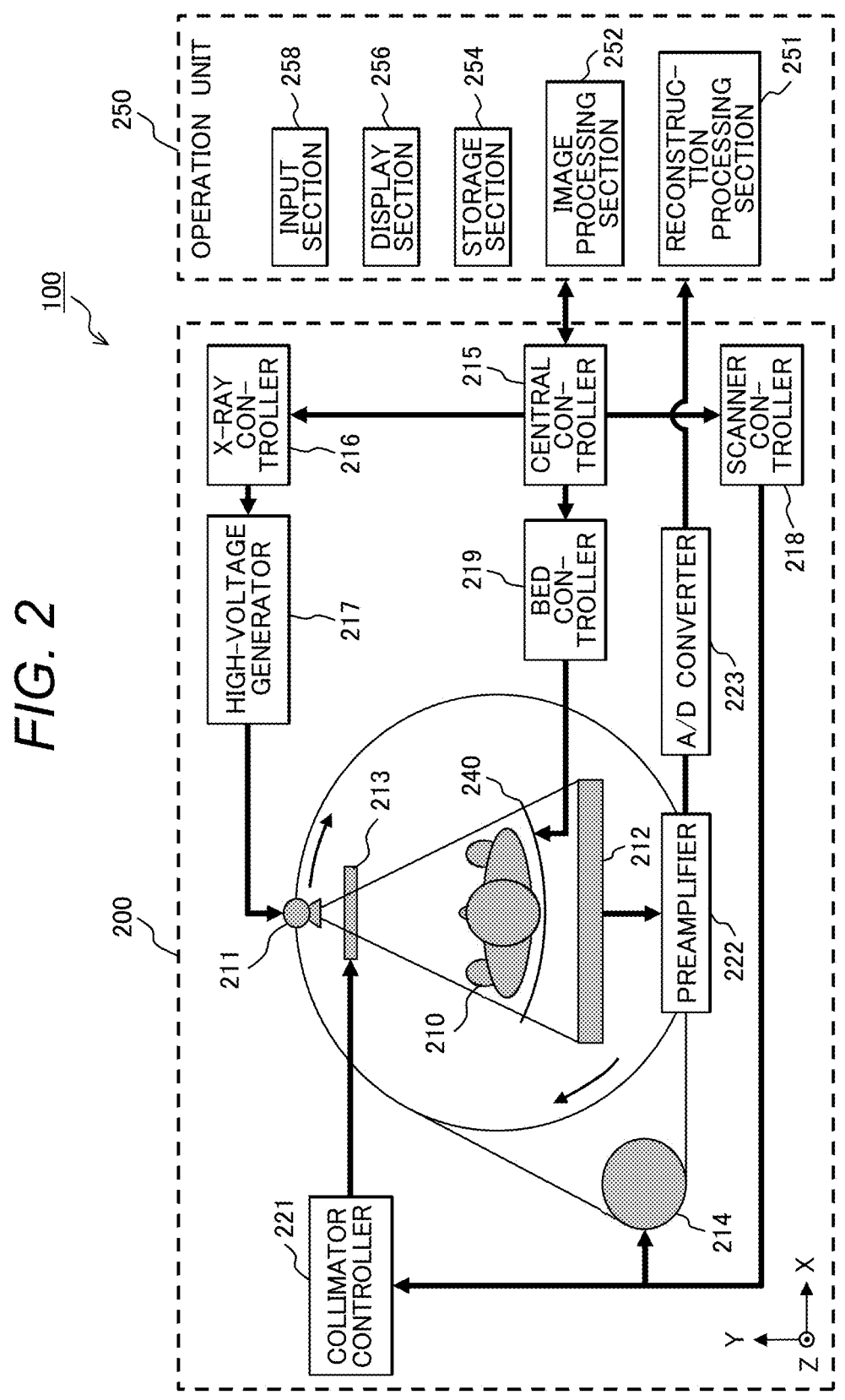
FIG. 2 is a general configuration diagram of X-ray CT equipment as an example of medical imaging equipment.

The medical imaging equipment 10 is, for example, X-ray CT (Computed Tomography) equipment that acquires projection data of the test object and generates a reconstructed image from the projection data and will be described later referring to FIG. 2. The medical image database 11 is a database system that stores the projection data acquired by the medical imaging equipment 10, the reconstructed image, a corrected image obtained by image processing of the reconstructed image, and so on.

The machine learning processor 12 is generated by machine learning to reduce the high absorber artifacts included in the reconstructed image, and is structured, for example, using a CNN (Convolutional Neural Network). In order to generate the machine learning processor 12, a reconstructed image without a high absorber such as metal is used as a teacher image. As an input image, a reconstructed image with high absorber artifacts is used. The high absorber artifacts are obtained by performing forward projection of an image with a high absorber area added to the teacher image, to generate projection data including a high absorber, and then performing back projection of the projection data.

Here, "high absorber" is typically metal, bone or contrast dye, which means a substance with a higher X-ray absorption rate than other tissues (for example, internal organs). Hereinafter, in the description of the embodiment, a high absorber is exemplified by metal and bone, but in the present invention, a high absorber is not limited to metal and bone. For example, in comparison between the fat and the muscle, the muscle has a higher X-ray absorption rate than the fat, so in an area where there is no metal, bone or contrast dye, the muscle can be said to be a high absorber. In other words, in the present invention, in a spot in which an area of interest is specified through selection by the user or by threshold extraction or other processing, artifacts caused by a tissue with a relatively high X-ray absorption rate can be reduced.

Next, the general configuration of X-ray CT equipment 100 as an example of medical imaging equipment 10 will be described referring to FIG. 2. In FIG. 2, the X axis represents the horizontal direction, the Y axis represents the vertical direction, and the Z axis represents the direction perpendicular to the plane of paper. The X-ray CT equipment 100 includes a scanner 200 and an operation unit 250. The scanner 200 includes an X-ray tube 211, a detector 212, a collimator 213, a drive unit 214, a central controller 215, an X-ray controller 216, a high-voltage generator 217, a scanner controller 218, a bed controller 219, a collimator controller 221, a preamplifier 222, an A/D converter 223, and a bed 240.

The X-ray tube 211 is a device that irradiates the test object 210 placed on the bed 240 with X rays. When the high voltage which the high-voltage generator 217 generates according to a control signal sent from the x-ray controller 216 is applied to the X-ray tube 211, the test object is irradiated with X rays from the X-ray tube 211.

The collimator 213 is a device that limits the radiation range of X rays emitted from the X-ray tube 211. The radiation range of X rays is determined according to a control signal sent from the collimator controller 221.

The detector 212 is a device that detects the X rays transmitted through the test object 210 to measure the spatial distribution of transmitted X rays. The detector 212 is installed in a manner to face the X-ray tube 211 and has many detecting elements arranged two-dimensionally in its surface facing the X-ray tube 211. The signal measured by the detector 212 is amplified by the preamplifier 222, and then it is converted into a digital signal by the A/D converter 223. After that, various corrections are made on the digital signal to thereby acquire projection data.

The drive unit 214 makes the X-ray tube 211 and the detector 212 rotate around the test object 210 according to a control signal sent from the scanner controller 218. As the X-ray tube 211 and the detector 212 rotate, X rays are irradiated and detected so that projection data at a plurality of projection angles is acquired. The unit of data collection at each projection angle is called a view. Regarding an array of detecting elements of the detector 212 that are arranged two-dimensionally, the rotation direction of the detector 212 is called a channel and the direction perpendicular to the channel is called a row. Projection data is identified by the view, channel, and row.

The bed controller 219 controls the movement of the bed 240 and while X rays are irradiated and detected, it holds the bed 240 still or moves the bed 240 at a constant speed in the Z axis direction, namely the direction of the body axis of the test object 210. A scan with the bed 240 held still is called an axial scan and a scan during movement of the bed 240 is called a spiral scan.

The central controller 215 controls the abovementioned operation of the scanner 200 according to an instruction from the operation unit 250. Next, the operation unit 250 is explained. The operation unit 250 includes a reconstruction processing section 251, an image processing section 252, a storage section 254, a display section 256, an input section 258 and so on.

The reconstruction processing section 251 generates a reconstructed image by back projection of the projection data acquired by the scanner 200. The image processing section 252 performs various types of image processing in order to make the reconstructed image suitable for diagnosis. The storage section 254 stores projection data, reconstructed images and image-processed images. The display section 256 displays a reconstructed image and an image-processed image. The input section 258 is used when the operator sets conditions to acquire projection data (tube voltage, tube current, scan speed, etc.) or reconstruction conditions for a reconstructed image (reconstruction filter, FOV size, etc.).

The operation unit 250 may be the medical image processing apparatus 1 shown in FIG. 1. In that case, the reconstruction processing section 251 and the image processing section 252 correspond to the arithmetic unit 2, the storage section 254 corresponds to the storage unit 4, the display section 256 corresponds to the display unit 7, and the input section 258 corresponds to the input device 8.

Next, referring to FIG. 3, an example of the processing sequence which is performed in the first embodiment will be explained step by step.

(S301)

The arithmetic unit 2 generates projection data corresponding to the high absorber area in the reconstructed image with high absorber artifacts. In other words, the arithmetic unit 2 functions as a projection data generating section that generates projection data corresponding to the high absorber area in the reconstructed image with high absorber artifacts.

Next, referring to FIG. 4, an example of the processing sequence at S301 will be explained step by step.

(S401)

The arithmetic unit 2 acquires a reconstructed image with high absorber artifacts. The reconstructed image with high absorber artifacts may be generated by back projection of projection data of the test object with a high absorber such as metal or bone, or may be read from the storage unit 4 or medical image database 11.

(S402)

The arithmetic unit 2 extracts a high absorber area from the reconstructed image with high absorber artifacts. The high absorber area is extracted, for example, by threshold processing. In other words, pixels with a higher pixel value than a predetermined threshold are extracted as a high absorber area from the reconstructed image.

(S403)

The arithmetic unit 2 generates projection data of the areas other than the high absorber area by forward projection of the areas other than the high absorber area. More specifically, projection data of the areas other than the high absorber area is generated by forward projection of the reconstructed image in which the pixel value of the high absorber area extracted at S402 is substituted by zero.

(S404)

The arithmetic unit 2 acquires projection data of the high absorber area by taking the difference between the projection data of the areas other than the high absorber area and the original projection data. More specifically, projection data of the high absorber area is generated by subtracting the projection data of the areas other than the high absorber area as generated at S403 from the projection data corresponding to the reconstructed image as acquired at S401.

Figure 3:
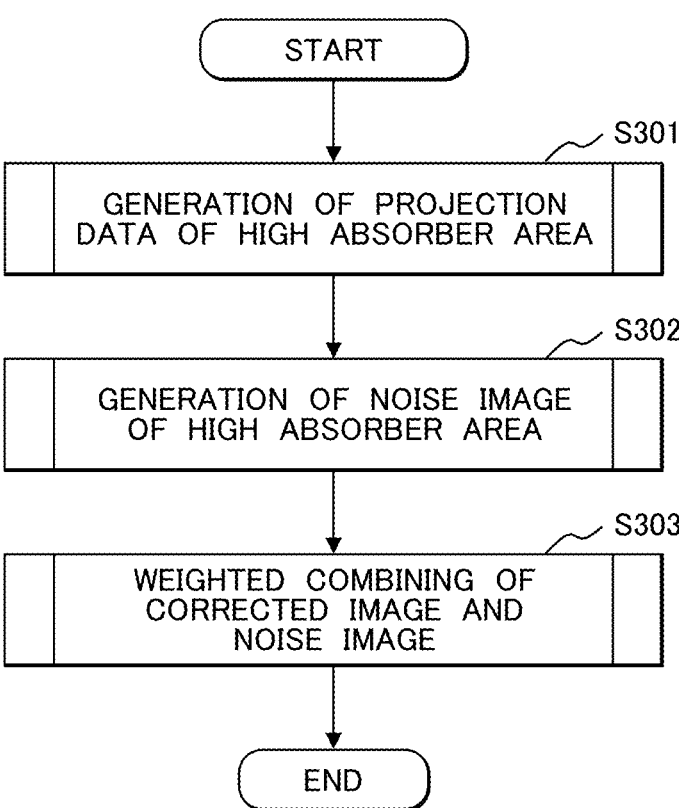
FIG. 3 is a flowchart that shows an example of the processing sequence according to a first embodiment.
Figure 4:
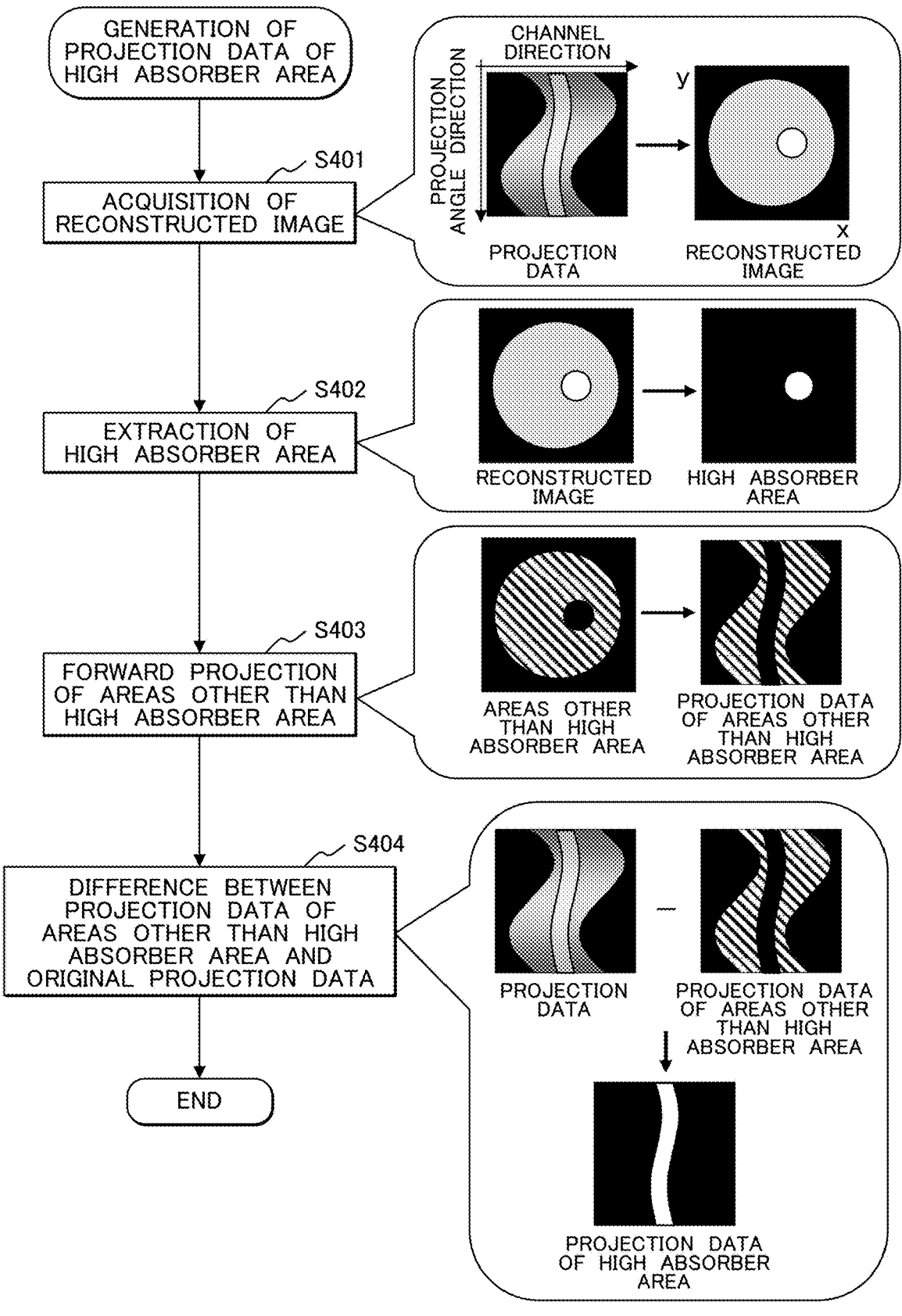
FIG. 4 is a flowchart that shows an example of the processing sequence at S301 according to the first embodiment.

With the processing sequence shown in FIG. 4, projection data corresponding to the high absorber area in the reconstructed image with high absorber artifacts is generated. By following the processing sequence in FIG. 4, projection data including noise caused by the high absorber area can be generated. Refer back to FIG. 3.

(S302)

The arithmetic unit 2 generates a noise image caused by the high absorber area. In other words, the arithmetic unit 2 functions as a noise image generating section that generates a noise image using the projection data including the noise caused by the high absorber area.

Next, referring to FIG. 5, an example of the processing sequence at S302 will be explained step by step.

(S501)

The arithmetic unit 2 performs even-odd division of the projection data corresponding to the high absorber area. In other words, the projection data of the high absorber area as generated at S301 is divided into odd-numbered views and even-numbered views, and odd-numbered projection data and even-numbered projection data are generated from a plurality of odd-numbered views and a plurality of even-numbered views, respectively.

(S502)

The arithmetic unit 2 reconstructs odd-numbered projection data and even-numbered projection data. In other words, an odd-numbered reconstructed image is generated by reconstruction of odd-numbered projection data generated at S301, and an even-numbered reconstructed image is generated by reconstruction of even-numbered projection data. Since the odd-numbered projection data and even-numbered projection data are generated by dividing adjacent views, the odd-numbered reconstructed image and even-numbered reconstructed image that are generated by reconstruction of the projection data include the same high absorber area.

(S503)

The arithmetic unit 2 generates a difference image between the odd-numbered reconstructed image and even-numbered reconstructed image. Since the odd-numbered reconstructed image and even-numbered reconstructed image include the same high absorber area, the high absorber area is deleted in the difference image and the noise only remains in the image. In other words, the noise caused by the high absorber area is converted into an image from the difference between the odd-numbered reconstructed image and even-numbered reconstructed image that are generated at S502. Since the difference processing causes the amount of noise to become $\sqrt{2}$ times larger, the noise image may be generated by subtracting the difference image by $\sqrt{2}$.

Figure 5:
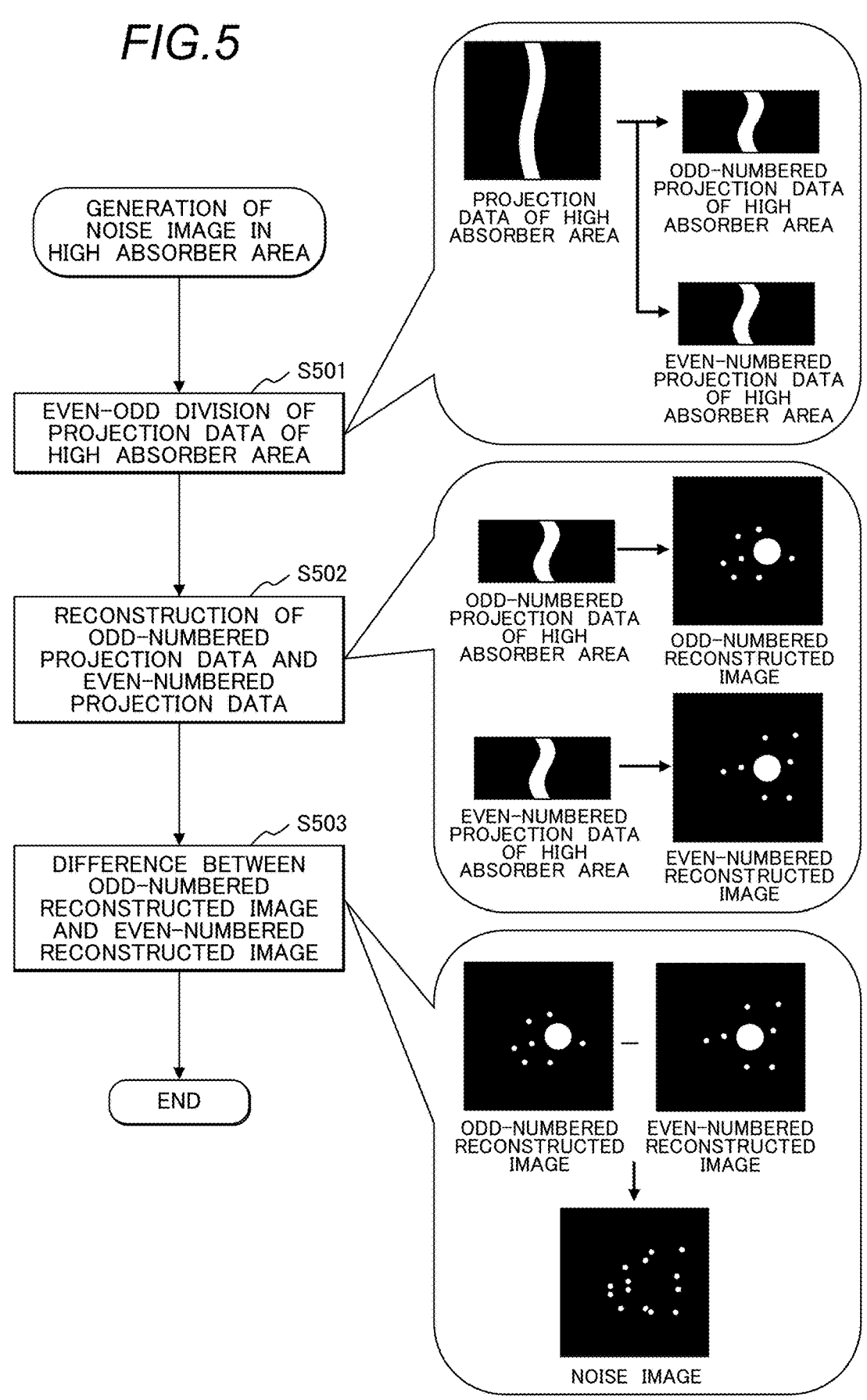
FIG. 5 is a flowchart that shows an example of processing sequence at S302 according to the first embodiment.

With the processing sequences shown in FIG. 5, an image of the noise caused by the high absorber area is generated. By following the processing sequence in FIG. 5, an image in which the high absorber area is not included and only the noise caused by the high absorber area remains is generated, so the noise bias in the corrected image can be reduced easily. Refer back to FIG. 3.

(S303)

The arithmetic unit 2 makes a weighted combining of the noise image generated at S302 with a corrected image in which the high absorber artifacts are corrected. In other words, the arithmetic unit 2 functions as a weighted combining section that makes a weighted combining of the noise image with the corrected image in which the high absorber artifacts are corrected.

Next, referring to FIG. 6, an example of the processing sequence at S303 will be explained step by step.

(S601)

The arithmetic unit 2 calculates the noise distribution of the reconstructed image with high absorber artifacts. More specifically, the standard deviation that is calculated using the pixel values of a target pixel and pixels around the target pixel in the reconstructed image is taken as the noise amount of the target pixel. In other words, the noise distribution is calculated by finding the noise amounts of all the pixels in the reconstructed image. Furthermore, the arithmetic unit 2 generates a noise coefficient image in which the calculated noise distribution is standardized. More specifically, the noise distribution is standardized by dividing each noise amount in the noise distribution by the maximum value in the noise distribution so that a noise coefficient image is generated.
(S602)

The arithmetic unit 2 generates an image by multiplication of the noise image of the high absorber area by the noise coefficient image. In other words, by multiplying the noise image generated at S302 by the noise coefficient image generated at S601, a noise-adjusted image that is used to reduce the noise bias of the corrected image is generated.
(S603)

The arithmetic unit 2 generates an image by summation of the corrected image with corrected high absorber artifacts and the noise-adjusted image. In other words, by adding the noise-adjusted image generated at S602 to the corrected image, a noise-added image is generated as an image in which the noise bias of the corrected image is reduced.

With the processing sequence shown in FIG. 6, a noise-added image in which the noise bias of the corrected image is reduced is generated. By following the processing sequence in FIG. 6, a noise-added image is generated only by adding the noise-adjusted image to the corrected image in which the high absorber artifacts are corrected, so the noise bias can be easily reduced between the remoter area and nearer area from the high absorber.

As explained above, a noise-added image as an image in which the noise bias of the corrected image is reduced is generated, by weighted combining of the noise image generated from projection data corresponding to the high absorber area with the corrected image in which high absorber artifacts are corrected. In the noise-added image, the noise bias caused by correction of high absorber artifacts is reduced, thereby preventing a problem in diagnostic imaging between the remoter area and nearer area from a high absorber.

Figure 7A:
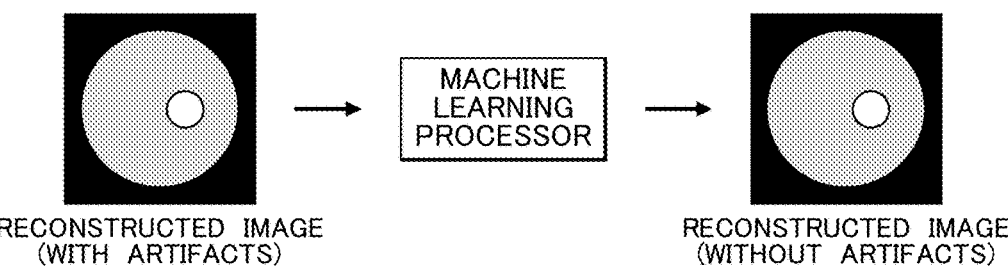
FIG. 7A shows an example of the machine learning processor.

A corrected image in which high absorber artifacts are corrected is generated by various MAR methods such as the beam hardening correction method, linear interpolation method, and deep learning method. Next, referring to FIG. 7A, an example of the machine learning processor that generates a corrected image will be explained. The machine learning processor as shown in FIG. 7A is generated by taking a reconstructed image without high absorber artifacts as a teacher image and a reconstructed image with high absorber artifacts added to the teacher image as an input image and machine-learning many pairs of input images and teacher images. An input image as a reconstructed image to which high absorber artifacts are added is generated by back projection of the projection data generated by forward projection of the image in which the high absorber area is added to the teacher image.

In the machine learning processor in FIG. 7A, in some cases the noise is excessively reduced in the vicinity of a high absorber and it is thus necessary to carry out the processing sequence shown in FIG. 3. Therefore, a machine learning processor that outputs an image in which high absorber artifacts are corrected and the noise bias is reduced may be generated by machine-learning taking the noise-added image or noise image generated by the processing sequence in FIG. 3 as an input image.

Figure 7B:
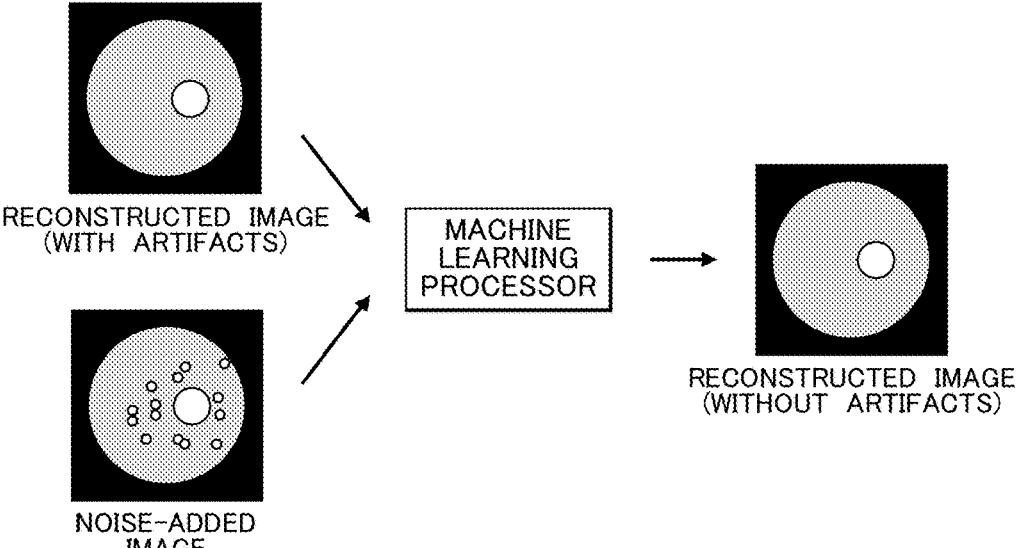
FIG. 7B shows an example of the machine learning processor.

Referring to FIG. 7B, an example of the machine learning processor that generates a corrected image in which high absorber artifacts are corrected and the noise bias is reduced will be explained. The machine learning processor shown in FIG. 7B is generated by taking a reconstructed image without high absorber artifacts as a teacher image and a reconstructed image with high absorber artifacts added to the teacher image and a noise-added image as input images, and machine-learning many pairs of input images and teacher images. As a noise-added image, the image generated at S303 is used. By machine-learning not only the reconstructed image with high absorber artifacts but also the noise-added image as input images, a machine learning processor that can output a corrected image in which high absorber artifacts are corrected and the noise bias is reduced is generated.

Figure 7C:
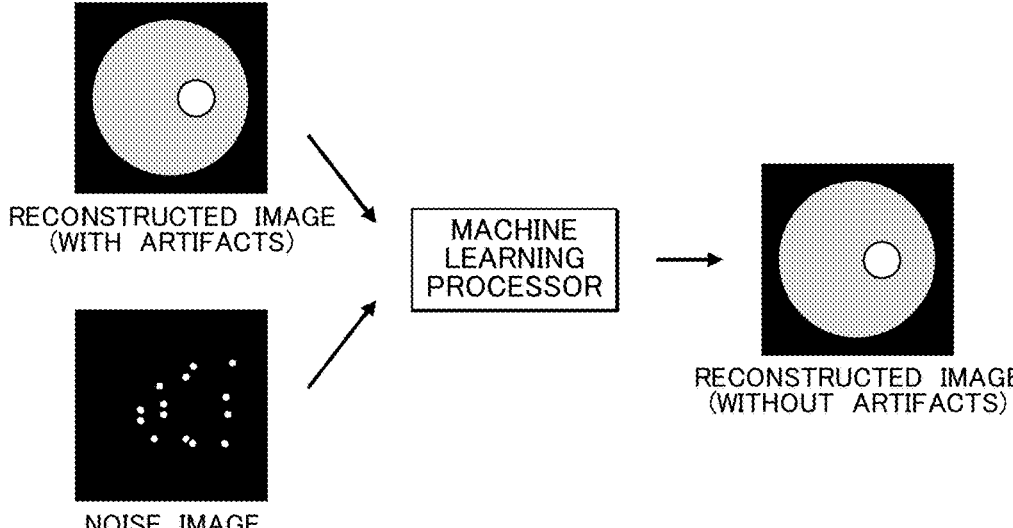
FIG. 7C shows an example of the machine learning processor.

Referring to FIG. 7C, another example of the machine learning processor that generates a corrected image in which high absorber artifacts are corrected and the noise bias is reduced will be explained. The machine learning processor shown in FIG. 7C is generated by taking a reconstructed image without high absorber artifacts as a teacher image and a reconstructed image with high absorber artifacts added to the teacher image and a noise image as input images, and machine-learning many pairs of input images and teacher images. As a noise image, the image generated at S302 is used. By machine-learning not only the reconstructed image with high absorber artifacts but also the noise image as input images, a machine learning processor that can output a corrected image in which high absorber artifacts are corrected and the noise bias is reduced is generated.

An embodiment of the present invention has been so far described. The present invention is not limited to the above embodiment, but the constituent elements can be embodied in modified forms without departing from the gist of the invention. Some of the constituent elements disclosed in the above embodiment may be combined as appropriate. Furthermore, among all the constituent elements described in the above embodiment, some constituent elements may be omitted.

REFERENCE SIGNS LIST

1: medical image processing apparatus
2: arithmetic unit
3: memory
4: storage unit
5: network adapter
6: system bus
7: display unit
8: input device
10: medical imaging equipment
11: medical image database
12: machine learning processor
100: X-ray CT equipment
200: scanner
210: test object
211: X-ray tube
212: detector
213: collimator
214: drive unit
215: central controller
216: X-ray controller
217: high-voltage generator
218: scanner controller
219: bed controller
221: collimator controller
222: preamplifier
223: A/D converter
240: bed
250: operation unit 251: reconstruction processing section
252: image processing section
254: storage section
256: display section
258: input section
What is claimed is:

1. A medical image processing apparatus comprising a processor and a program storage device tangibly embodying a program of instructions executable by the processor, the medical image processing apparatus including the processor performing a method comprising:

generating projection data corresponding to a high absorber area in a reconstructed image with high absorber artifacts;

generating a noise image using the projection data; and making a weighted combining of the noise image with a corrected image in which high absorber artifacts are corrected, in the weighted combining the corrected image being added to a noise-adjusted image generated by weighting the noise image.

2. The medical image processing apparatus according to claim 1, wherein in the method, the processor generates the projection data corresponding to the high absorber area from a difference between the projection data corresponding to the reconstructed image and projection data of areas other than the high absorber area in the reconstructed image.

3. A medical image processing apparatus comprising a processor and a program storage device tangibly embodying a program of instructions executable by the processor, the medical image processing apparatus including the processor performing a method comprising:

generating projection data corresponding to a high absorber area in a reconstructed image with high absorber artifacts, the projection data including odd-numbered projection data and even-numbered projection data generated by even-odd division of the projection data corresponding to the high absorber area;

generating an odd-numbered reconstructed image and an even-numbered reconstructed image by reconstructing the odd-numbered projection data and the even-numbered projection data;

generating a noise image using the projection data, the noise image being generated based on a difference between the odd-numbered reconstructed image and the even-numbered reconstructed image; and making a weighted combining of the noise image with a corrected image in which high absorber artifacts are corrected.

4. The medical image processing apparatus according to claim 1, wherein the method further comprises adding an image obtained by multiplying the noise image by a noise coefficient image generated based on a noise distribution of the reconstructed image, to the corrected image.

5. The medical image processing apparatus according to claim 1, further comprising:

a machine learning processor that is generated by machine-learning taking a reconstructed image without high absorber artifacts as a teacher image, and a reconstructed image with high absorber artifacts added to the teacher image and a noise-added image generated as input images.

6. The medical image processing apparatus according to claim 1, further comprising:

a machine learning processor that is generated by machine-learning taking a reconstructed image without high absorber artifacts as a teacher image, and a reconstructed image with high absorber artifacts added to the teacher image and a noise image generated as input images.

7. A medical image processing method for correcting high absorber artifacts, comprising:

a projection data generating step of generating projection data corresponding to a high absorber area in a reconstructed image with high absorber artifacts;

a noise image generating step of generating a noise image using the projection data; and a weighted combining step of making a weighted combining of the noise image with a corrected image in which high absorber artifacts are corrected, in the weighted combining the corrected image being added to a noise-adjusted image generated by weighting the noise image.

8. The medical image processing method according to claim 7, wherein the projection data corresponding to the high absorber area is generated from a difference between the projection data corresponding to the reconstructed image and projection data of areas other than the high absorber area in the reconstructed image.

9. The medical image processing method according to claim 7, wherein the noise-adjusted image is obtained by multiplying the noise image by a noise coefficient image generated based on a noise distribution of the reconstructed image, to the corrected image.

10. The medical image processing apparatus according to claim 3, wherein the projection data corresponding to the high absorber area is generated from a difference between the projection data corresponding to the reconstructed image and projection data of areas other than the high absorber area in the reconstructed image.

11. The medical image processing apparatus according to claim 3, wherein the noise-adjusted image is obtained by multiplying the noise image by a noise coefficient image generated based on a noise distribution of the reconstructed image, to the corrected image.

* * * * *